July 17, 1923.
W. T. BOOTH
PROTECTIVE DEVICE
Filed Nov. 3, 1917
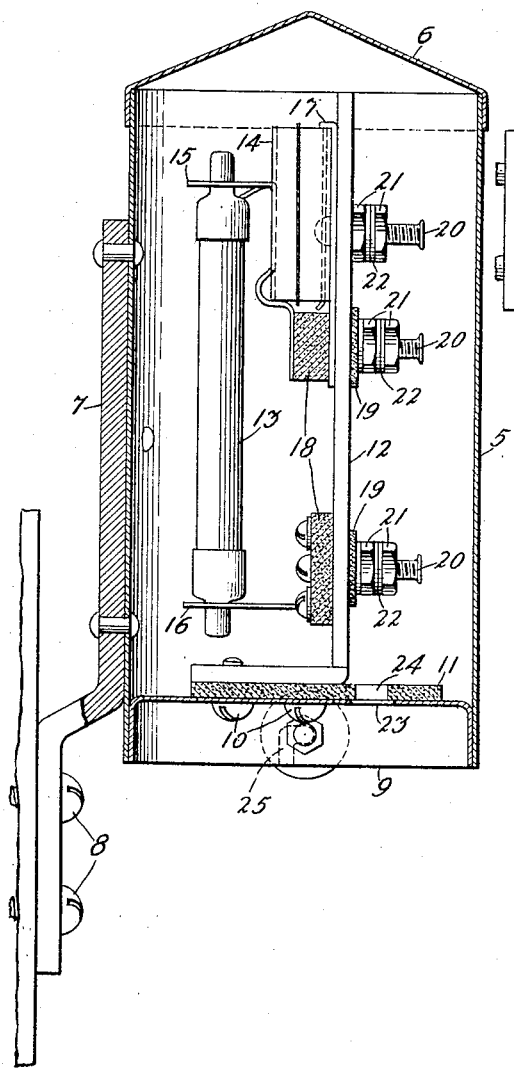
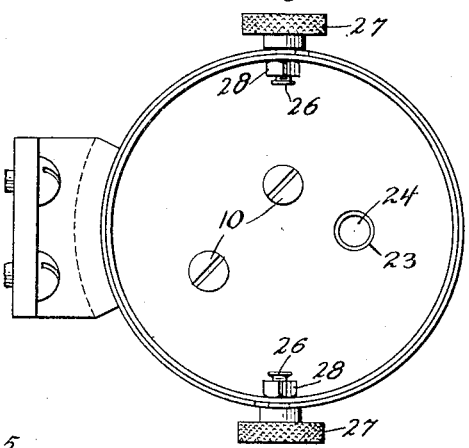
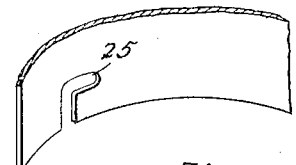
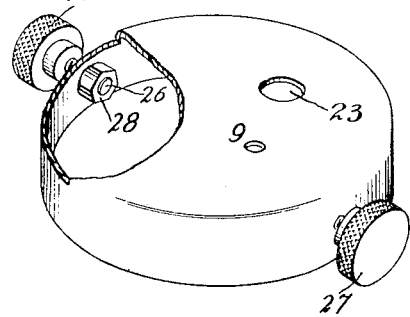
Inventor:
William T. Booth.
by J. E. Roberts
Att'y.

Patented July 17, 1923.

1,462,026

UNITED STATES PATENT OFFICE.

WILLIAM T. BOOTH, OF EAST ORANGE, NEW JERSEY, ASSIGNOR TO WESTERN ELECTRIC COMPANY, INCORPORATED, OF NEW YORK, N. Y., A CORPORATION OF NEW YORK.

PROTECTIVE DEVICE.

Application filed November 3, 1917. Serial No. 200,071.

*To all whom it may concern:*

Be it known that I, WILLIAM T. BOOTH, a citizen of the United States, residing at East Orange, in the county of Essex and State of New Jersey, have invented certain new and useful Improvements in Protective Devices, of which the following is a full, clear, concise, and exact description.

This invention relates to protective devices, and in particular to the type of protective devices in which fuses and lightning-arresters for an individual line are enclosed in a protecting casing.

In certain types of line construction, particularly those employed in connection with military telephone lines or telephone lines of the Forest Reserve Service, it is of importance that the protective equipment for the individual stations be placed in a suitable enclosure where it will be protected from dust and weather and yet where it is easily accessible for replacement or inspection. It is also of importance that the protective elements be removable from the bottom, since, when the apparatus is mounted in tents, it is desirable, in order that the apparatus be out of the way as much as possible, to mount the protector at the top of the tent, not leaving any space for removing from the top.

It is the object of the present invention to provide telephone equipment especially suitable for use on lines used for military or similar service, and to attain this object the invention provides a protector equipment in which mounting means are permanently secured to the enclosing casing and the protective elements, consisting usually of fuses and carbon block arresters, are mounted on a metal plate which is inserted in the casing from the bottom and locked in place by a pair of mounting screws in the base member which register with bayonet slots in the lower edge of the casing.

The various features of this invention may be more clearly understood by reference to the accompanying drawing, in which Fig. 1 is a view of the complete protector, the casing and base plate being shown in section; Fig. 2 is a bottom view of the protector shown in Fig. 1; Fig. 3 is a fragmentary view of the lower portion of the case showing the bayonet slots used for mounting purposes; and Fig. 4 is a perspective view of the metal plate on which the protective elements are mounted, a portion of this plate being removed to more clearly show the method of securing the fastening screws which register with the bayonet slots shown in Fig. 3.

Referring now to the drawings, the enclosing casing or housing 5 is provided with a conical top portion 6 and a bracket 7 to which it is securely riveted. The off-set portion of this bracket is provided with perforations to receive the mounting screws 8—8 by means of which the apparatus may be mounted to a side-wall, tent pole or other support. The lower end of this casing is open and adapted to receive a cup-shaped mounting plate 9. Secured to this plate by the screws 10—10, but insulated therefrom by means of a plate 11 of hard rubber or other suitable insulating material, is the bracket portion 12 upon which are mounted a pair of fuses 13 and a pair of lightning-arresters 14, only one fuse and arrester being shown in the drawing. The fuses 13 are secured by means of the mounting springs 15 and 16, the spring 15 also being so formed as to hold the lightning-arrester 14 against the ground plate 17. Insulating blocks 18—18 and insulated washers 19—19 are provided to insulate the protective elements from the mounting bracket, and terminal screws 20—20 equipped with nuts 21—21 and washers 22—22 are provided for making the necessary line and instrument connections. An aperture 23 in the base plate 9 and an aperture 24 in the insulating member 11 are provided for inserting the connecting wires. The lower portion of casing 5 is provided with a pair of bayonet slots 25 diametrically opposite from each other. The base plate 9 is provided with a pair of binding screws 26—26 equipped with knurled heads 27—27 which are adapted to register with the bayonet slots 25 and permit the two parts being locked together. The binding screws 26—26 engage the threads in the nuts 28—28 soldered rigidly on the inside of the base plate 9.

The construction as described permits the ready removal of the protective equipment by loosening the binding screws and giving the mounting plate a partial turn. In this way the entire equipment may be quickly removed for inspection or replacing of defective parts and in fact all the wiring may be done before the apparatus is placed within the casing. Moreover, the shape of the mounting plate is such as to completely close the case, thereby protecting the apparatus from dust and weather.

What is claimed is:

1. A protective device comprising a casing, means for mounting said casing upon a suitable support, a removable plate having a wide flange adapted to fit into and engage the inner wall of said casing, a protective element mounted upon said plate and adapted to project within and be held clear of said casing when said plate is in position, and an aperture in said removable plate for the passage of connecting wires.

2. A protective device comprising a casing, means for mounting said casing upon a suitable support, a removable cup-shaped member having a wide peripheral portion adapted to fit into and engage the lower wall of said casing, a bracket for carrying protective elements mounted on the inverted side of said cup-shaped member and adapted to project within and be held clear of said casing when said plate is in position, means for fastening said plate in position, and an aperture in said removable plate for the passage of connecting wires.

In witness whereof, I hereunto subscribe my name this 31st day of October A. D. 1917.

WILLIAM T. BOOTH.